(12) United States Patent
Valadon

(10) Patent No.: US 9,264,281 B2
(45) Date of Patent: Feb. 16, 2016

(54) WIRELESS COMMUNICATION RECEIVER WITH I/Q IMBALANCE ESTIMATION AND CORRECTION TECHNIQUES

(71) Applicant: MStar Semiconductor, Inc., Hsinchu Hsien (TW)

(72) Inventor: Cyril Valadon, Garden City (GB)

(73) Assignee: MStar Semiconductor, Inc., Hsinchu Hsien (TW)

( * ) Notice: Subject to any disclaimer, the term of this patent is extended or adjusted under 35 U.S.C. 154(b) by 34 days.

(21) Appl. No.: 14/068,032

(22) Filed: Oct. 31, 2013

(65) Prior Publication Data

US 2015/0117577 A1    Apr. 30, 2015

(51) Int. Cl.
*H04L 27/38* (2006.01)
*H04B 1/10* (2006.01)

(52) U.S. Cl.
CPC .......... *H04L 27/3863* (2013.01); *H04B 1/1027* (2013.01)

(58) Field of Classification Search
CPC ..................................................... H04B 1/1027

USPC .................................................. 375/350, 346
See application file for complete search history.

(56) References Cited

U.S. PATENT DOCUMENTS

| 8,442,150 | B1* | 5/2013 | Dark et al. ..................... 375/296 |
| 8,526,518 | B2* | 9/2013 | Feigin et al. ................... 375/260 |
| 2010/0232490 | A1* | 9/2010 | Balakrishnan et al. ....... 375/227 |
| 2012/0183106 | A1* | 7/2012 | Komaili et al. ............... 375/346 |

* cited by examiner

*Primary Examiner* — Michael Neff
(74) *Attorney, Agent, or Firm* — Edell, Shapiro & Finnan, LLC

(57) ABSTRACT

Techniques are provided that utilize information on the characteristics of the transmitted signal to improve the accuracy of the I/Q imbalance estimation and correction. These techniques can be used to achieve improved image rejection performance over existing solutions, through the use of signal conditioning, windowing and the use of statistical information on the received signal. A number of techniques aimed at improving the accuracy of the I/Q imbalance estimation/correction are presented, including different modes of I/Q imbalance estimation and I/Q imbalance correction in the presence of a complex IF filter in the transceiver. The processing is performed mostly in the DBB in order to be area/power efficient.

20 Claims, 12 Drawing Sheets

WIRELESS COMMUNICATION RECEIVER WITH I/Q IMBALANCE ESTIMATION AND CORRECTION TECHNIQUES

FIELD OF THE INVENTION

The present disclosure relates to wireless communication systems and in particular to techniques that utilize information on the characteristics of the signal being processed to improve the accuracy of I/Q imbalance estimation and correction.

BACKGROUND OF THE INVENTION

In a wireless receiver, the analog to digital converters (ADC) typically operate at low sampling rates. Hence, the received Radio Frequency (RF) signal must be mixed down to be processed. In a GSM receiver, the quadrature signals are down-converted to an Intermediate Frequency (IF) which can typically be either a zero intermediate frequency (ZIF) or very low intermediate frequency (VLIF).

In theory, the quadrature mixing provides infinite attenuation for the image band. However, in practice, there is always some imbalance between the in-phase (I) and quadrature phase (Q) branches, which can be due to amplitude and phase impairments between the local oscillator (LO) paths, mismatches between the respective I and Q branches after the analog down-conversion, as well as temperature variations and component ageing. This I/Q imbalance introduces unwanted spectral images which results in a mixture of the desired signals and interfering images.

When using a VLIF, signals on adjacent carriers can produce very strong interfering images of up to 50-100 dB stronger than the required signal (Valkama, M.; Renfors, M.; "Advanced DSP for I/Q imbalance compensation in a low-IF receiver," IEEE International Conference on Communications, 2000. ICC 2000). However, using a non-zero IF can be beneficial in reducing the influence of flicker noise or 1/f noise. In order to avoid the problems caused by strong interfering images, the receiver requires either a very tight balance between the I and Q branches or some form of I/Q imbalance estimation and correction. Furthermore, it is usually beneficial to implement any I/Q imbalance estimation and correction scheme in the Digital Base-Band (DBB) of the wireless receiver as this will lead to a more power and area efficient solution than one implemented in the analogue domain.

Some of the existing I/Q imbalance estimation and correction solutions for low IF receivers use an adaptive approach as in the papers submitted by Valkama, M.; Renfors, M.; "Advanced DSP for I/Q imbalance compensation in a low-IF receiver," IEEE International Conference on Communications, 2000. ICC 2000, and Elahi, I.; Muhammad, K.; Balsara, P. T.; "I/Q mismatch compensation using adaptive de-correlation in a low-IF receiver in 90-nm CMOS process," IEEE Journal of Solid-State Circuits, February 2006. A low complexity solution is also presented by Mailand, M.; Richter, R.; and Jentschel; H.-J.: "I/Q-imbalance and its compensation for non-ideal analog receivers comprising frequency-selective components", Adv. Radio Sci., 2006.

These existing solutions however do not utilize information on the characteristics of the signal being processed to improve the accuracy of the I/Q imbalance estimation and correction. Moreover, according to the preferred embodiments presented in this document, the I/Q imbalance estimation and I/Q imbalance correction are performed independently and such an approach provides further performance gains as well as enable the implementation complexity to be reduced.

SUMMARY OF THE INVENTION

New methods are provided herein for I/Q imbalance estimation and correction in wireless communication receivers. These new techniques exploit information on the characteristics of the transmitted and received signals and achieve improved correction performance over existing approaches. The methods described in this document can also provide advantages in terms of implementation complexity over prior-art solutions.

According to the invention, the receiver calculates a number of quantities characterizing properties of the received signal. These quantities are calculated over at least one block of I/Q samples and are then provided to a processor. The processor uses these quantities to configure an I/Q imbalance correction module which operates on the received signal prior to it being processed to retrieve the transmitted information. The I/Q imbalance correction module will typically be configured to operate over at least one block of received I/Q samples.

In one embodiment of the invention, the quantities provided to the processor include the power in the I and Q components of the received signal as well as a cross-correlation between the I and Q components of the received signal. In a further embodiment of the invention, DC offset values are calculated for the I and Q branches of the receiver.

The configuration calculated by the processor may take the form of a single complex equalization weight. The processor may also derive explicit values of the I/Q phase and gain imbalance when calculating the configuration of the I/Q imbalance correction module.

The processor may make use of quantities characterizing properties of the received signal generated over multiple blocks of I/Q samples in order to improve the accuracy of the calculated correction configuration. A number of different approaches for the combination of the quantities across multiple blocks are presented.

The processor may also exploit prior-knowledge on the characteristics of the transmitted signal in order to derive the I/Q imbalance correction configuration. This information may take the form of power in the I and Q components of the transmitted signal as well as cross-correlation between the I and Q components of the transmitted signal.

Knowledge on range of I/Q gain and imbalance that can be experienced at the receiver can also be used by the processor in order to improve the accuracy of the I/Q imbalance correction process.

The receiver can be configured such that the block of I/Q samples on which I/Q imbalance correction is performed is different from the block of I/Q samples used for the I/Q imbalance estimation. For example, the I/Q samples from which the I/Q imbalance estimates are generated may originate from a test signal with characteristics known to the receiver whilst the correction with the derived configuration may be applied to I/Q samples from a different and unknown signal.

According to one aspect of the invention, signal conditioning techniques are applied to the received signal used for the generation of the quantities characterizing the received signal. In one embodiment of the invention, the signal conditioning consists in applying a windowing signal to the received signal. In an alternative embodiment, the windowing signal is not applied to the received signal but the effect of such a windowing signal is taken into account when computing the quantities characterizing properties of the received signal. In yet a further embodiment of the invention, the signal conditioning applied to the received signal takes the form of a digital filtering operation. The configuration of the signal conditioning may be adapted to expected impairments in the receiver processing, such as frequency offset. The configuration of the signal conditioning may also be adapted according to characteristics, such as the frequency response, of the received signal.

According to a further aspect of the invention, characteristics of the transmitted signal are controlled so as to meet some design criterions which are known to lead to improved I/Q imbalance estimation. In one embodiment of the invention, the spectrum of the transmitted signal and the number of I/Q samples used for I/Q imbalance estimation are jointly designed to minimize a cost function characterizing the I/Q imbalance estimation error.

BRIEF DESCRIPTION OF THE DRAWINGS

For a better understanding of the present invention, reference is made, by way of example, to the following drawings. It is to be noted, however, that the appended drawings illustrate only typical embodiments and are not to be considered limiting of its scope.

DESCRIPTION OF EXAMPLE EMBODIMENTS

The embodiments of the invention described herein provide techniques that utilize information on the characteristics of the signal being processed to improve the accuracy and reduce the implementation complexity of the I/Q imbalance estimation and correction performed in a wireless receiver. These techniques can be used to achieve improved image rejection performance over existing solutions, through the use of signal conditioning, windowing and by exploiting statistical information on either the received signal or the transmitted signal. A number of techniques aimed at improving the accuracy of the I/Q imbalance estimation/correction are presented, including different modes of I/Q imbalance estimation and I/Q imbalance correction. The processing is performed mostly in the DBB in order to be area and power efficient.

Figure 1:
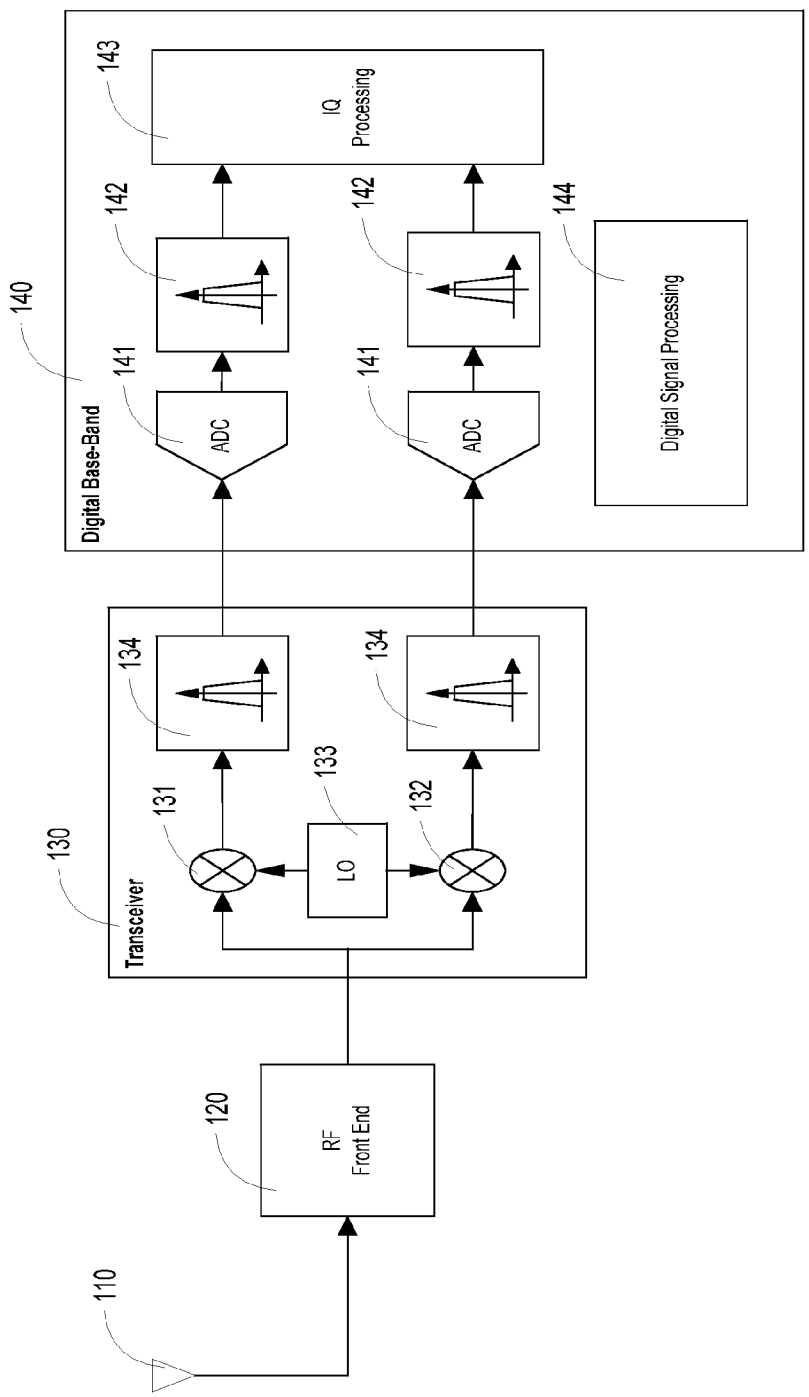
FIG. 1 shows a simplified block diagram of a wireless receiver.

FIG. 1 shows a simplified block diagram of a VLIF receiver. The signal received at the antenna (110) is input to the filtering and amplification circuitry of the RF front end (120). The received signal is then provided to the transceiver circuitry (130). The received signal and the outputs of the Local Oscillator (LO) (133) are applied to two mixers, (131) and (132), to down-convert the quadrature signal into separate I and Q branches. The down-converted signals are then passed through low pass filters (LPF) (134) to improve the receiver selectivity and are applied to the DBB module (140).

The signals are input to the ADCs 141, passed through digital filters (142) and applied to the I/Q processing circuitry (143). The DBB also contains the Digital Signal Processing (DSP) circuitry (144).

In a low-IF receiver architecture, phase and amplitude imbalances between the I and Q branches generate images which can severely interfere with the desired signal. The problem is quite significant for GSM/GPRS/EGPRS systems as the receiver needs to be able to operate correctly in the presence of strong adjacent channel interferers and this issue will now be illustrated.

The signal received at the antenna (110) can be modelled as:

$$r(t)=2\times Re\{e^{jw_ct}\times u(t)\} \quad \text{Equation 1}$$

with $w_c$ denoting the angular carrier frequency.

The signal u(t) may, for example, comprise a wanted component as well as an interfering signal and can be expressed as:

$$u(t)=w(t)+i(t)\times e^{jw_it} \quad \text{Equation 2}$$

where w(t) represents the desired baseband signal, i(t) represents the baseband version of the interfering signal and $w_i$ is the angular frequency of the interfering signal, expressed relative to that of the desired signal. Typically, the signal u(t) will also contain noise terms.

The equation representing the received signal model can be re-written as:

$$r(t)=e^{jw_it}\times u(t)+e^{-jw_it}\times u^*(t) \quad \text{Equation 3}$$

The LO signal can be expressed mathematically as:

$$x_{Lo}(t)=\cos(w_{Lo}t)+j\times g\times\sin(w_{Lo}t+\theta) \quad \text{Equation 4}$$

$w_{Lo}$ denotes the angular frequency of the LO, g denotes the I/Q gain mismatch and θ denotes the I/Q phase mismatch. In the absence of mismatch between the I and Q branches, g=1 and θ=0.

The LO signal can be re-written as:

$$x_{Lo}(t) = K_1 e^{jw_{Lo}t} + K_2 e^{-jw_{Lo}t} \quad \text{Equation 5}$$

$$K_1 = \frac{1+ge^{j\theta}}{2}$$

$$K_2 = \frac{1-ge^{-j\theta}}{2}$$

The image rejection ratio (IRR) is then defined as:

$$IRR = 20\log_{10}\left(\left|\frac{K_1}{K_2}\right|\right) \quad \text{Equation 6}$$

The IRR is a measure, expressed in decibel units, of the attenuation applied to the spectral images created during the mixing process.

After mixing, the received signal can be expressed as:

$$y(t) = r(t) \times x_{Lo}(t)$$

$$y(t) = K_1 u(t) e^{j(w_c + w_{Lo})t} + K_1 u^*(t) e^{j(-w_c + w_{Lo})t} + K_2 u(t) e^{j(w_c - w_{Lo})t} + K_2 u^*(t) e^{-j(w_c + w_{Lo})t} \quad \text{Equation 7}$$

Given that $w_{Lo} = w_{IF} - w_c$ ($w_{IF}$ denotes the IF), and ignoring the high frequency terms which are filtered out by the low-pass filters, the received signal can be expressed as:

$$y(t) = K_1 u(t) e^{j w_{IF} t} + K_2 u^*(t) e^{-j w_{IF} t} \quad \text{Equation 8}$$

The first term in the equation above corresponds to the combination of the wanted and interfering signals and the second term corresponds to the associated images.

The received signal model presented in Equation 8 can be expanded in order to explicitly show the contribution of the wanted signal and that of the interfering signal:

$$y(t) = K_1 w(t) e^{j w_{IF} t} + K_1 i(t) e^{j(w_{IF} + w_i) t} + K_2 w^*(t) e^{-j w_{IF} t} + K_2 i^*(t) e^{-j(w_{IF} + w_i) t} \quad \text{Equation 9}$$

The first term in the above equation represents the desired signal to be retrieved. The second term denotes the interference corresponding to the adjacent channel signal. The third and fourth terms then correspond to the images of the wanted and adjacent channel signals, respectively.

Figure 2:
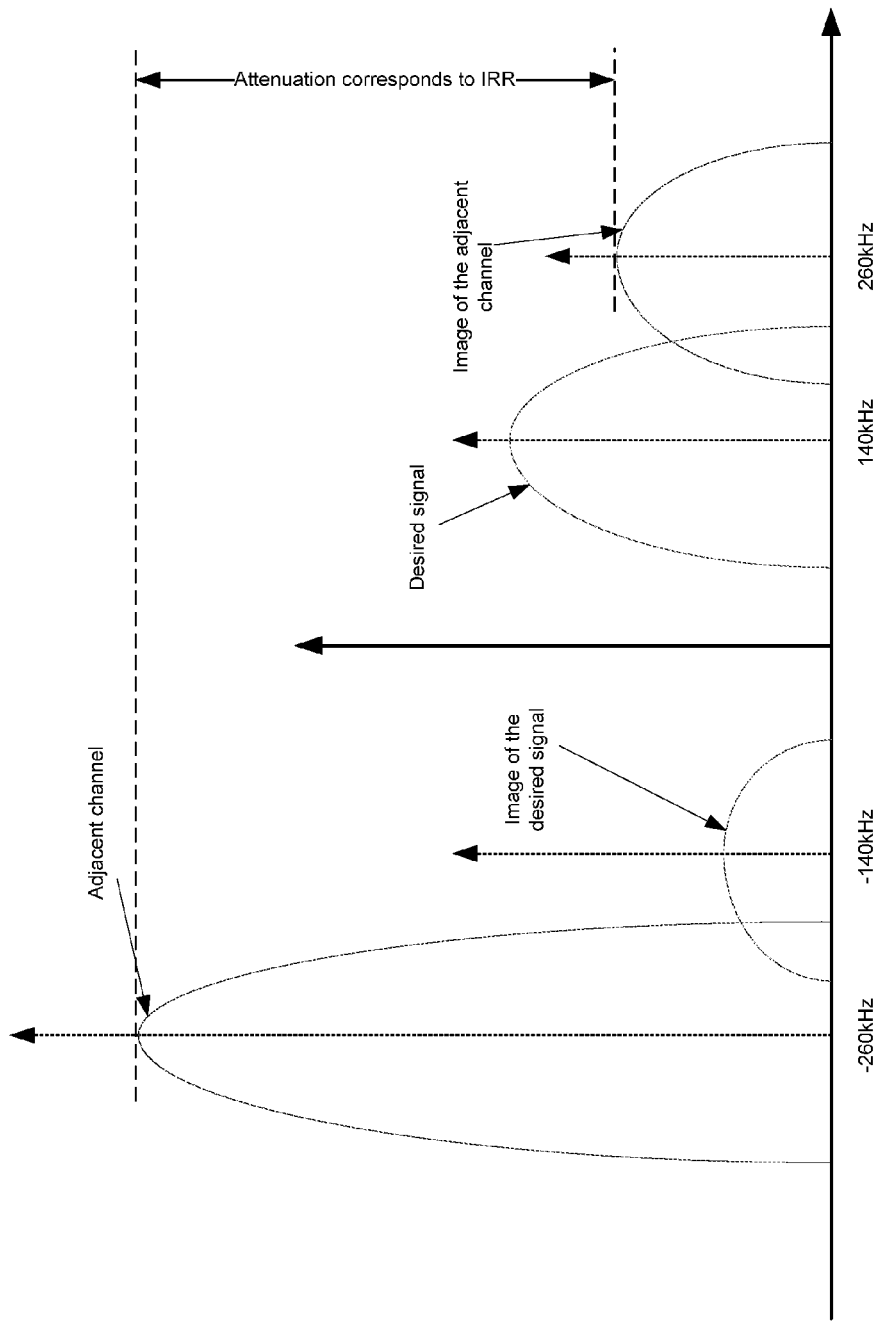
FIG. 2 shows the impact of I/Q imbalance in the presence of a second adjacent interferer.

FIG. 2 presents the spectrum of the received signal after down-conversion to an IF equal to 140 kHz, showing the wanted signal, the image of the wanted signal, the adjacent channel signal, and the image of the adjacent channel signal. It can be seen that when the adjacent channel power is higher than that of the desired signal, the image resulting from I/Q imbalance in the mixing process will significantly interfere with the signal to be recovered.

The level of interference created by the spectral image onto the desired signal will vary not only with its level, which depends on the IRR, but also with the VLIF value. In the example presented in FIG. 2, the VLIF is equal to 140 kHz and the adjacent signal is located 400 kHz away from the desired signal. With this configuration, the frequency separation between the desired signal and the interfering image is equal to 260 kHz–140 kHz=120 kHz. For a VLIF of 120 kHz, the frequency separation would increase to 280 kHz–120 kHz=160 kHz. Hence, for the same image level, the interference experienced by the signal to be recovered will be lower for the VLIF of 120 kHz than for the VLIF of 140 kHz.

Figure 3:
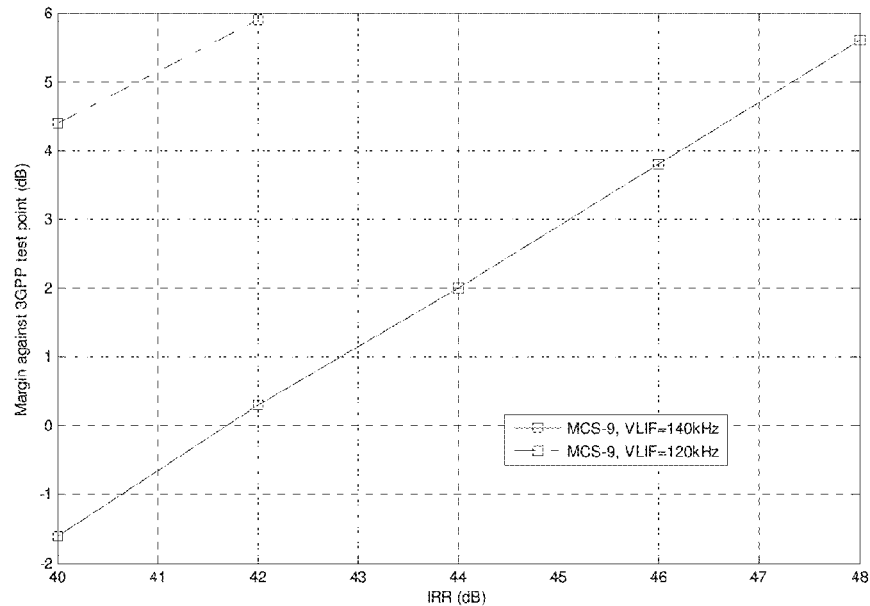
FIG. 3 shows a graph of the image rejection ratio requirements for the 3GPP TS45.005 second adjacent channel performance.

This effect is illustrated in FIG. 3 which shows a graph of the IRR requirements for the 3GPP TS45.005 second adjacent channel performance for VLIF configurations of 120 kHz and 140 kHz. From the graph, we can see that for a VLIF of 140 kHz, an IRR of more than 42 dB is necessary in order to meet the 3GPP requirements. This requirement is significantly relaxed when a VLIF of 120 kHz is used as a margin of 4 dB against the 3GPP requirements is already achieved with an IRR value of 40 dB. Comparing the performance curves for the two VLIF configurations, it can be seen that lowering the VLIF value from 140 kHz down to 120 kHz leads to a reduction exceeding 6 dB in the IRR required to achieve a given level of performance.

Hence, for a given IRR performance of the receiver, the reliability of the desired signal recovery will increase as the VLIF value is reduced when considering only the effect of the I/Q imbalance. However, other effects such as flicker noise, will become more significant at lower VLIF values. It is therefore desirable to keep the VLIF value as high as possible and then either implement techniques to estimate the I/Q imbalance and remove its effects from the received signal or ensure a very accurate match between the I and Q branches.

Figure 4:
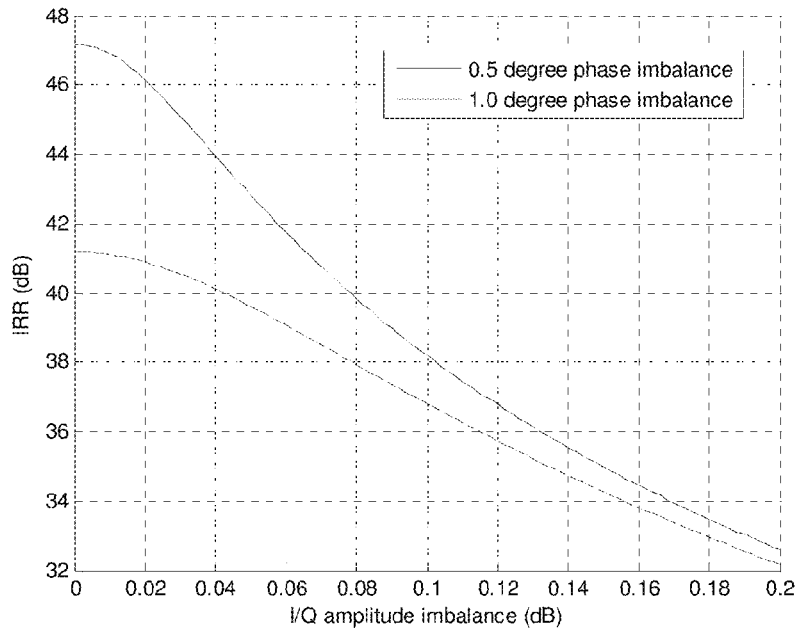
FIG. 4 shows the image rejection ratio achieved for different values of I/Q amplitude and phase imbalance.

FIG. 4 shows the IRR achieved for different values of I/Q amplitude and phase imbalance. It can be seen that with a 1.0 degree phase imbalance, the 42 dB requirement cannot be met, even with perfect amplitude balance. With a 0.5 degree phase imbalance, an amplitude imbalance of less than 0.06 dB is necessary to meet the 42 dB requirement. It is easily understood that meeting such tight balance requirements between the I and Q branches can be very challenging for the transceiver (130) to achieve. Hence, it is highly desirable for the receiver to be able to estimate and correct the I/Q imbalance and such techniques will now be presented.

Figure 5:
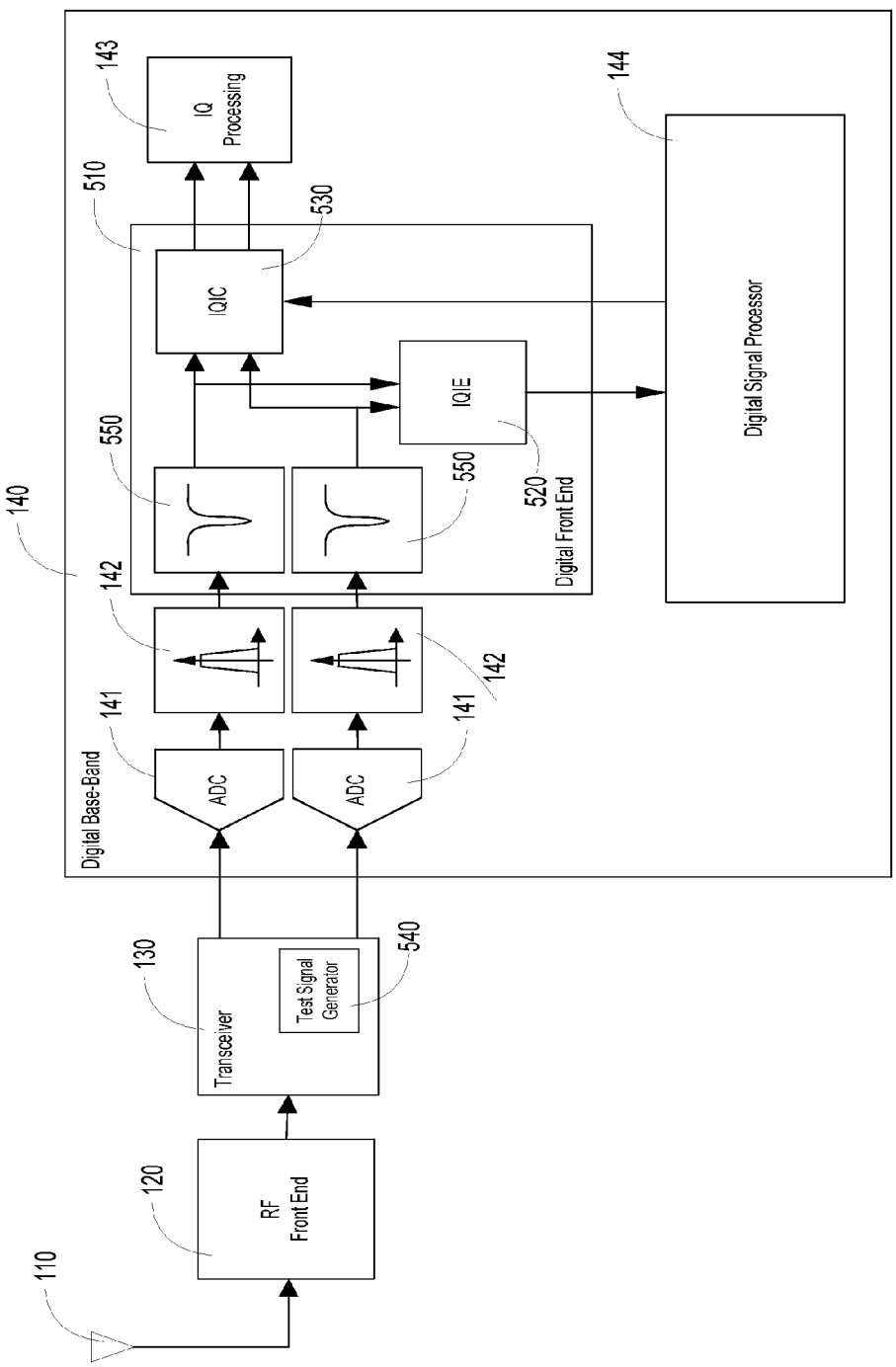
FIG. 5 shows a simplified block diagram of the digital base-band emphasising the digital front end with I/Q imbalance estimation and correction.

FIG. 5 shows a simplified block diagram where the digital base band estimates and corrects the I/Q imbalance. The received signal is processed by the RF front end (120) and transceiver (130) as in FIG. 1 and applied to the DBB (140). The separate I and Q branches of the received signal are then applied to the ADCs (141) and the digital filters (142), the resulting signals then being input to the Digital Front End (DFE) module (510). Any DC offset introduced and not fully corrected in the transceiver (130) is then removed by the DC offset removal circuits (550). In a receiver operating with a VLIF, the DC offset removal circuits can be implemented as notch filters where the frequency position of the frequency response notch is aligned to the VLIF. The resultant digital signals are input to the I/Q Imbalance Estimation (IQIE) module (520) which calculates a number of quantities on the received signal to derive estimates of the gain and phase imbalance. The DSP (144) uses these quantities to estimation the gain and phase imbalance values and compute the I/Q imbalance correction weight. The DSP (144) may also make use of a-priori information on the transmitted signal in order to improve the I/Q imbalance correction.

Figure 6:
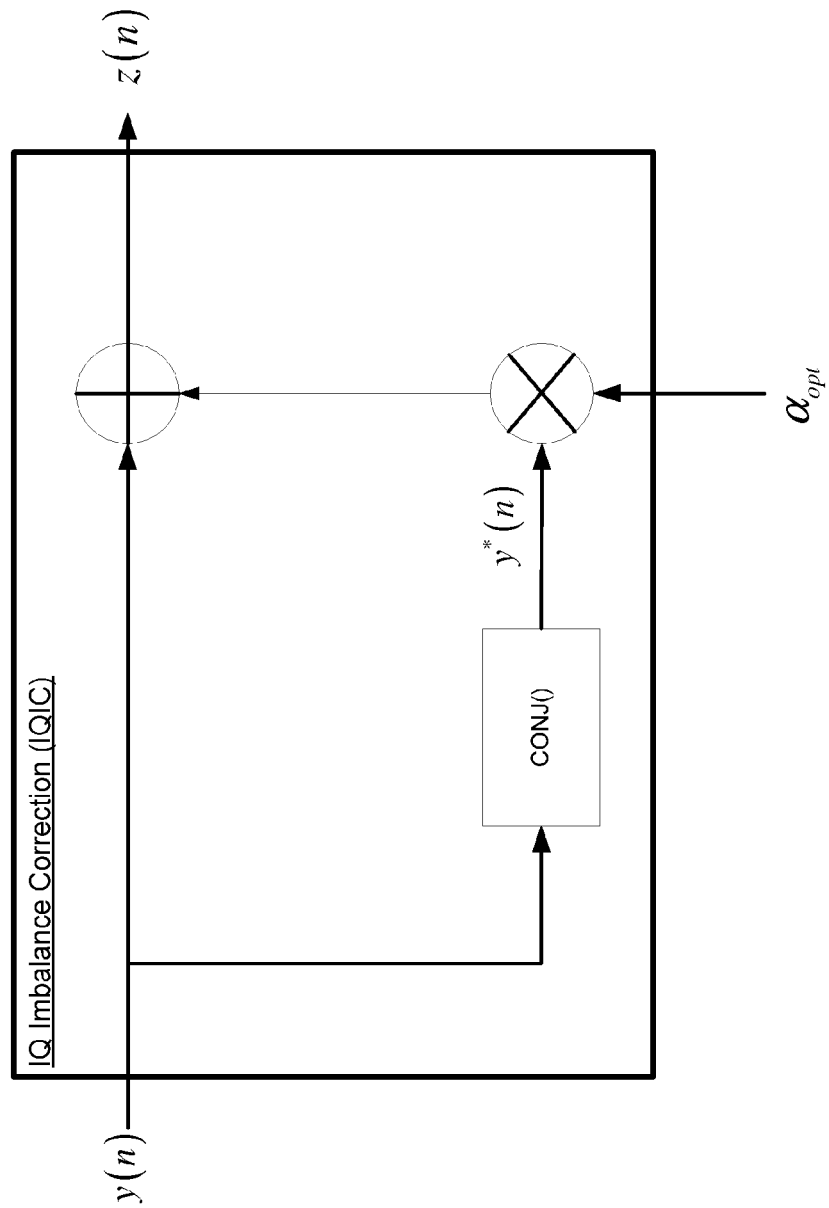
FIG. 6 shows a simplified block diagram of the I/Q Imbalance Correction (IQIC) block.

Once the DSP has computed the I/Q imbalance correction weight, the correction is applied to the received signal by the I/Q Imbalance Correction (IQIC) module (530). FIG. 6 shows a simplified block diagram of the I/Q Imbalance Correction (IQIC) block. The I/Q imbalance estimation and the I/Q imbalance correction processes are completely independent, so it is possible to apply a correction to a received signal using a correction weight which has been calculated using a different signal. This presents benefits in terms of the received signal not requiring any buffering and can also lead to improved accuracy for the I/Q imbalance estimation and correction.

Assuming that the I/Q imbalance is not frequency dependent, the correction can be implemented in module 530 as:

$$z(t) = y(t) + \alpha \times y^*(t) \quad \text{Equation 10}$$

where z(t) denotes the signal after I/Q imbalance correction.

The signal post I/Q imbalance compensation can then be expressed as:

$$z(t) = (K_1 + \alpha K_2^*) \times (w(t) e^{j w_{IF} t} + i(t) e^{j(w_{IF} + w_i) t}) + (K_2 + \alpha K_1^*) \times (w^*(t) e^{-j w_{IF} t} + i^*(t) e^{-j(w_{IF} + w_i) t}) \quad \text{Equation 11}$$

It is therefore possible to cancel the images generated by the I/Q imbalance by setting the equalizer tap to the optimal value $\alpha_{opt}$:

$$\alpha_{opt} = -\frac{K_2}{K_1} \qquad \text{Equation 12}$$

When the optimum equalizer weight is used, the signal after the I/Q imbalance correction can then be found equal to:

$$z(t)_{opt} = K_1\left(1 - \left|\frac{K_2}{K_1}\right|^2\right)(w(t)e^{jw_{IF}t} + i(t)e^{j(w_{IF}+w_i)t}) \qquad \text{Equation 13}$$

Alternatively, it is possible to include the inverse of the gain term $$K_1\left(1 - \left|\frac{K_2}{K_1}\right|^2\right)$$

in the equalizer tap value. When such scaling is applied to the equalizer coefficient, the signal after I/Q imbalance correction can be expressed as:

$$z(t)_{opt} = w(t)e^{jw_{IF}t} + i(t)e^{j(w_{IF}+w_i)t} \qquad \text{Equation 14}$$

It can be seen from the above two equations that it is possible to perfectly correct for the I/Q imbalance with perfect knowledge of the $K_1$ and $K_2$ coefficients. Since the values taken by these two quantities only depend on those of the I/Q gain imbalance g and I/Q phase imbalance θ, it is possible to correct the I/Q imbalance if estimates of these parameters can be generated by the wireless receiver. It is easily understood that in a real implementation, it will not be possible to perfectly estimate the I/Q gain and phase imbalance parameters. The accuracy of the I/Q imbalance correction process will then be directly dependent on the accuracy of these estimates.

The correction implemented by module 530 has been described using time-continuous notations for the different signals. It should be understood that such notation was only used for clarity of presentation. The implementation of the I/Q imbalance estimation and correction processes will typically be implemented after the received signal has been sampled and hence will operate on the discrete time equivalents of the signals.

The issue to resolve is now the estimation of the ideal equalizer weight, or equivalently that of the I/Q gain and phase imbalance parameters. The method used in the embodiment of the invention for the derivation of the I/Q imbalance is estimation through auto-correlation and cross-correlation. For this method the real part of the received signal y(t) can be expressed as:

$$Re\{y(t)\} = Re\{(K_1 + K_2^*)u(t)e^{jw_{IF}t}\} \qquad \text{Equation 15}$$

Similarly, the imaginary part of the received signal y(t) can be expressed as:

$$Im\{y(t)\} = Im\{(K_1 - K_2^*)u(t)e^{jw_{IF}t}\} \qquad \text{Equation 16}$$

It can be seen from the above equations that in the absence of I/Q imbalance, the average power on the I and Q branches will be identical. It is therefore possible to use this property in order to estimate the I/Q imbalance. First the following quantities are defined:

$$A = E(|Im(y(t))|^2)$$

$$B = E(|Re(y(t))|^2)$$

$$C = E(Re(y(t))Im(y(t))) \qquad \text{Equation 17}$$

where the expectation above E( ) is taken over the different samples.

The different quantities above can then be expressed as a function of the I/Q imbalance as:

$$A = g^2 \times \gamma$$

$$B = \gamma$$

$$C = g\gamma \sin\theta \qquad \text{Equation 18}$$

where γ denotes the power in the real and imaginary parts of the received signal which are assumed to be identical:

$$\gamma = E(|Im(u(t)e^{j\omega_{IF}t})|^2) = E(|Re(u(t)e^{j\omega_{IF}t})|^2) \qquad \text{Equation 19}$$

The above equations can then be used in order to provide an estimation method for the I/Q imbalance:

$$g = \sqrt{\frac{A}{B}} \qquad \text{Equation 20}$$

$$\sin\theta = \left(\frac{g \times C}{A}\right) = \left(\frac{C}{B \times g}\right) = \frac{C}{\sqrt{A \times B}} \qquad \text{Equation 21}$$

The two equations above can be used to derive the I/Q imbalance parameters. From these values, the equalizer weight required for the correction can be computed.

Figure 7:
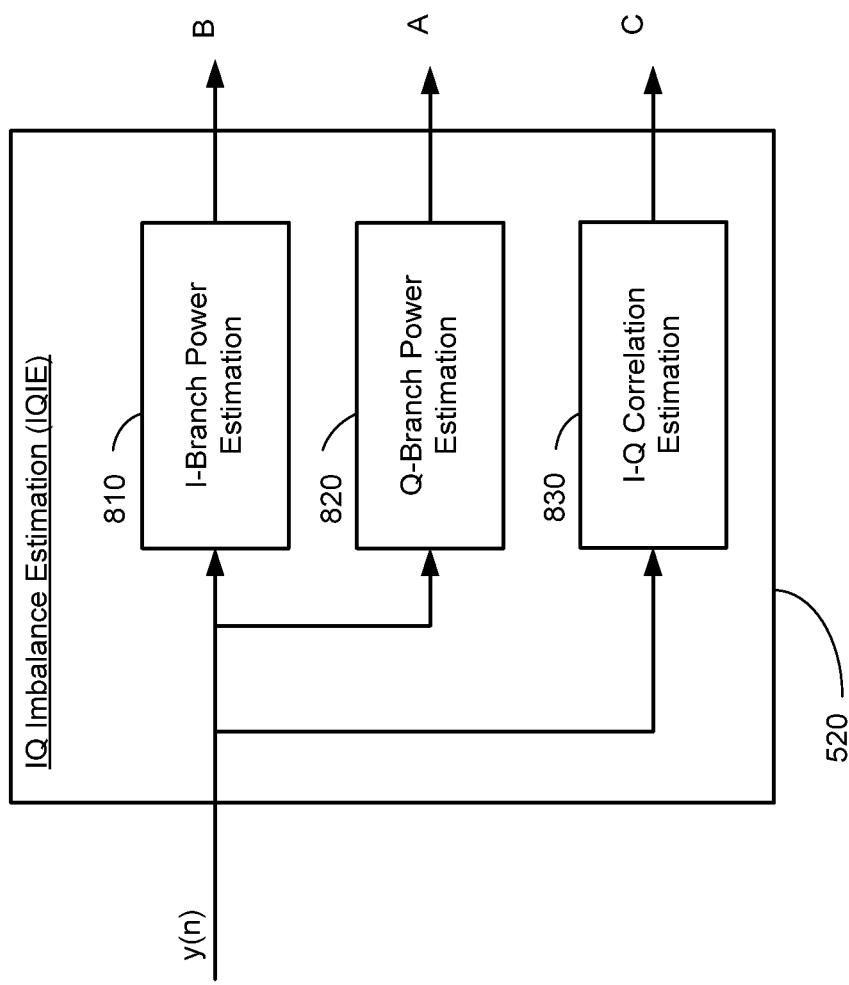
FIG. 7 shows a simplified block diagram of the I/Q Imbalance Estimation (IQIE) block.

FIG. 7 presents an embodiment of the I/Q imbalance estimation module (520) using the equations above. It can be seen that the processing implemented in (520) operates on the sampled version y(n) of the received signal. The I-branch power estimation block (810) generates an estimate of the quantity B as follows:

$$B = \frac{1}{N}\sum_{n=0}^{N-1} (Im\{y(n)\})^2 \qquad \text{Equation 22}$$

N denotes the number of received signal samples over which the estimation is performed. The Q-branch power estimation block (820) generates an estimate of the quantity A in a similar manner:

$$A = \frac{1}{N}\sum_{n=0}^{N-1} (Re\{y(n)\})^2 \qquad \text{Equation 23}$$

Finally, the module (830) calculates the cross-correlation between the I and Q branches as:

$$C = \frac{1}{N}\sum_{n=0}^{N-1} Re\{y(n)\} \times Im\{y(n)\} \qquad \text{Equation 24}$$

These three quantities are then provided to the digital signal processor (144) in order to derive the equalizer weight to be applied in the I/Q imbalance correction block (530). According to the invention, the I/Q imbalance estimation and correction will typically be performed on blocks of samples. It can be seen from the equations defining the quantities A, B and C that the computation of these values is performed on a block of N I/Q samples. This block of N samples can for example correspond to a GSM burst as defined in 3GPP TS 45.002, "Multiplexing and multiple access on the radio path". However, the application of the invention is not restricted to such a configuration and further possible embodiments will be presented in this document.

It is also important to note that the set of samples over which the I/Q imbalance correction is applied in (530) does not need to be the same set over which the I/Q imbalance estimation has been performed. Unlike the approaches presented in the prior-art documents previously referenced, the I/Q imbalance estimation in (520) and the I/Q imbalance correction in (530) can be performed completely independently. Such an approach presents a number of advantages in terms of implementation cost, estimation and correction performance as well as flexibility in the design of the I/Q imbalance estimation and correction processing.

Since the I/Q imbalance estimation and the I/Q imbalance correction can be performed on different sets of samples, it is possible to avoid buffering the received signal in the DBB (140) prior to the I/Q processing (143). Using an example applicable to the GSM/GPRS/EGPRS system, it is possible to estimate the I/Q imbalance correction using samples from burst n and then apply the derived correction on the samples corresponding to burst n+1. Such a delay in the application of the estimated correction configuration will typically not influence the performance and avoids the need to store the samples corresponding to burst n, thus reducing the memory required in the DBB (140).

It is also possible to make use of the independence of the I/Q imbalance estimation (520) and correction (530) processes in order to improve performance. For example, it is possible for the DSP (144) to combine the results from the processing of multiple bursts in (520) before the correction configuration is applied in (530). The A, B and C values provided by (510) could be averaged by the DSP (144), or alternatively accumulated, over multiple blocks of samples. These averaged values can then be used in order to derive an estimate of the equalizer gain used in the correction block (510). Alternatively, it would be possible to derive an equalizer gain value for each block of N samples and then average the gain values across multiple blocks before this average value is applied to (510). In a further embodiment, estimates of $K_1$ and $K_2$ are generated for each block and then averaged over multiple blocks in the DSP (144). The equalizer weight to be applied in (530) can then be calculated from the averaged values of $K_1$ and $K_2$.

Such a process of combining results across multiple blocks of samples can be refined to take into account the expected accuracy of the estimates generated for each block of samples. It would be possible to generate a quality metric, such as an SNR value, for each block of N samples processed by (520) and then use the quality metrics associated with the multiple blocks in order to control how the combination across the multiple blocks is performed. For example, estimated values associated with blocks with a quality metric lower than a given threshold could be discarded from the accumulation. Alternatively, it would be possible to weight the contributions from the different blocks in accordance with the quality metric, thus generating a weighted average value.

Further performance improvement techniques can be used in the DSP (144) when processing the A, B and C values to derive the equalizer weight. The range of possible values for the I/Q gain g and phase θ imbalance will usually be known by the wireless receiver. It is therefore possible for the DSP to excise estimates which are outside of the this a-priori known range. In an alternative embodiment, variance values for the estimates of the I/Q gain and phase imbalance can be generated and can be used in order to decide on the set of samples to be used for the configuration of the correction module (530). It will be understood by the person skilled in the art that such approaches are not available to approaches requiring a closed-loop operation between the I/Q imbalance estimation and correction processes such as in "I/Q mismatch compensation using adaptive de-correlation in a low-IF receiver in 90-nm CMOS process," Elahi, I.; Muhammad, K.; Balsara, P. T.; IEEE Journal of Solid-State Circuits, February 2006.

Since the I/Q imbalance estimation (520) and correction (530) can be performed on independent sets of samples, it is also possible for the estimation in (520) to be performed on samples for which the correction does not need to be performed by (530). Alternatively, it is possible to perform I/Q imbalance correction without running the I/Q imbalance estimation module (520).

For example, it is possible to estimate the I/Q imbalance during a calibration stage with I/Q samples which are not required for reception and I/Q processing (143). A number of possible approaches exist for the use of such a calibration procedure. For example, the calibration could be performed once during the manufacturing of the cellular handset and the resulting I/Q imbalance estimates and associated correction configuration could then be stored in the DSP (144) for use in any future operation. According to such an embodiment, the I/Q imbalance correction configuration would then be fixed throughout the entire operation of the device.

Alternatively, it would be possible to perform such a calibration procedure prior to each data reception. This could be performed by getting the transceiver (130) to generate a test signal in (540) prior to any data reception. This test signal would then be processed in (520) prior to the data reception in order to calculate the quantities required by the DSP (144) to calculate the correction to be applied during the data reception. Such an approach will typically lead to a very good estimation accuracy but presents drawbacks in terms of power consumption for example as the transceiver then needs to be powered-on for a period longer than is required for data reception only.

In a further embodiment, the regular updates are not performed on samples of a test signal but can use blocks of I/Q samples to be received and processed by the I/Q processing block (143) as described earlier.

It will be obvious to the person skilled in the art, that it is possible to combine the different approaches for the I/Q imbalance estimation and correction in a number of different ways. For example, it would be possible to derive an initial I/Q imbalance correction configuration using an initial calibration procedure and then update this initial configuration using regular but possibly infrequent signal reception windows. These signal reception windows could correspond to the reception of either a test signal or a signal to be processed by the I/Q processing block (143). Alternatively, it would be possible to monitor the quality of the I/Q imbalance correction procedure and then generate updates to the correction configuration whenever the quality is measured to be lower than required. The I/Q imbalance correction quality could be estimated directly from the received signal or could be derived from indirect measurements. For example, it can be expected that the I/Q imbalance correction would deteriorate as the handset temperature varies. It would therefore be possible to monitor temperature in order to decide when updates to the I/Q imbalance correction are performed.

Figure 8:
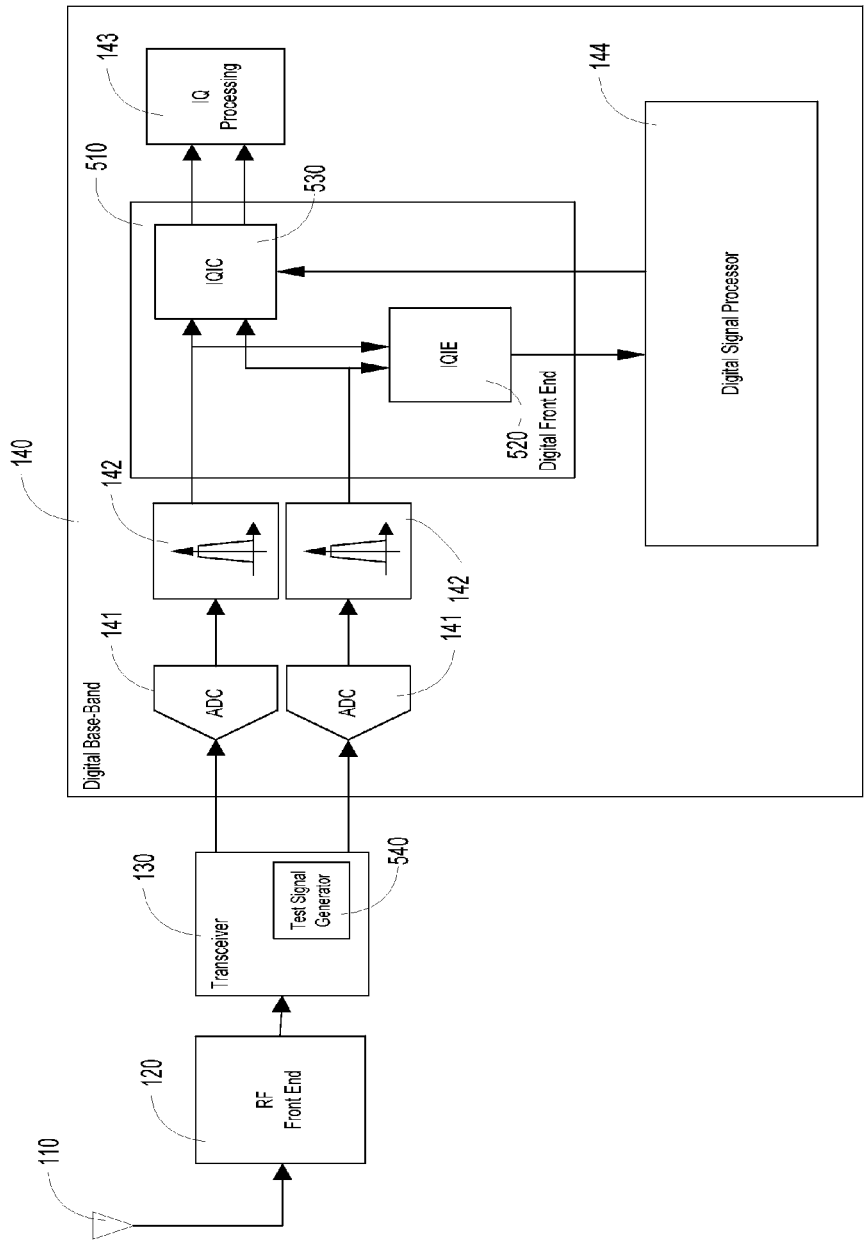
FIG. 8 shows a simplified block diagram of the digital base-band with I/Q imbalance estimation and correction without explicit removal of the DC offset.

The estimation methods discussed in the previous paragraphs assume that any DC offset in the received signal y(t) is removed by the DC offset removal circuit (550). Alternatively, explicit estimation and removal of the DC offset can be avoided, as shown in FIG. 8, and the estimation method can be adapted according to the following paragraphs.

In the presence of a DC error, the real and imaginary parts of the received signal in Equation 15 and Equation 16 can be expressed as $$Re\{y(t)\}=Re\{(K_1+K_2^*)u(t)e^{j\omega IFt}\}+E\{Re(y(t))\}$$

$$Im\{y(t)\}=Im\{(K_1-K_2^*)u(t)e^{j\omega IFt}\}+E\{Im(y(t))\} \quad \text{Equation 25}$$

where $E\{Re(y(t))\}$ and $E\{Im(y(t)))\}$ are the in-phase and quadrature DC errors of the received signal y(t).

Figure 9:
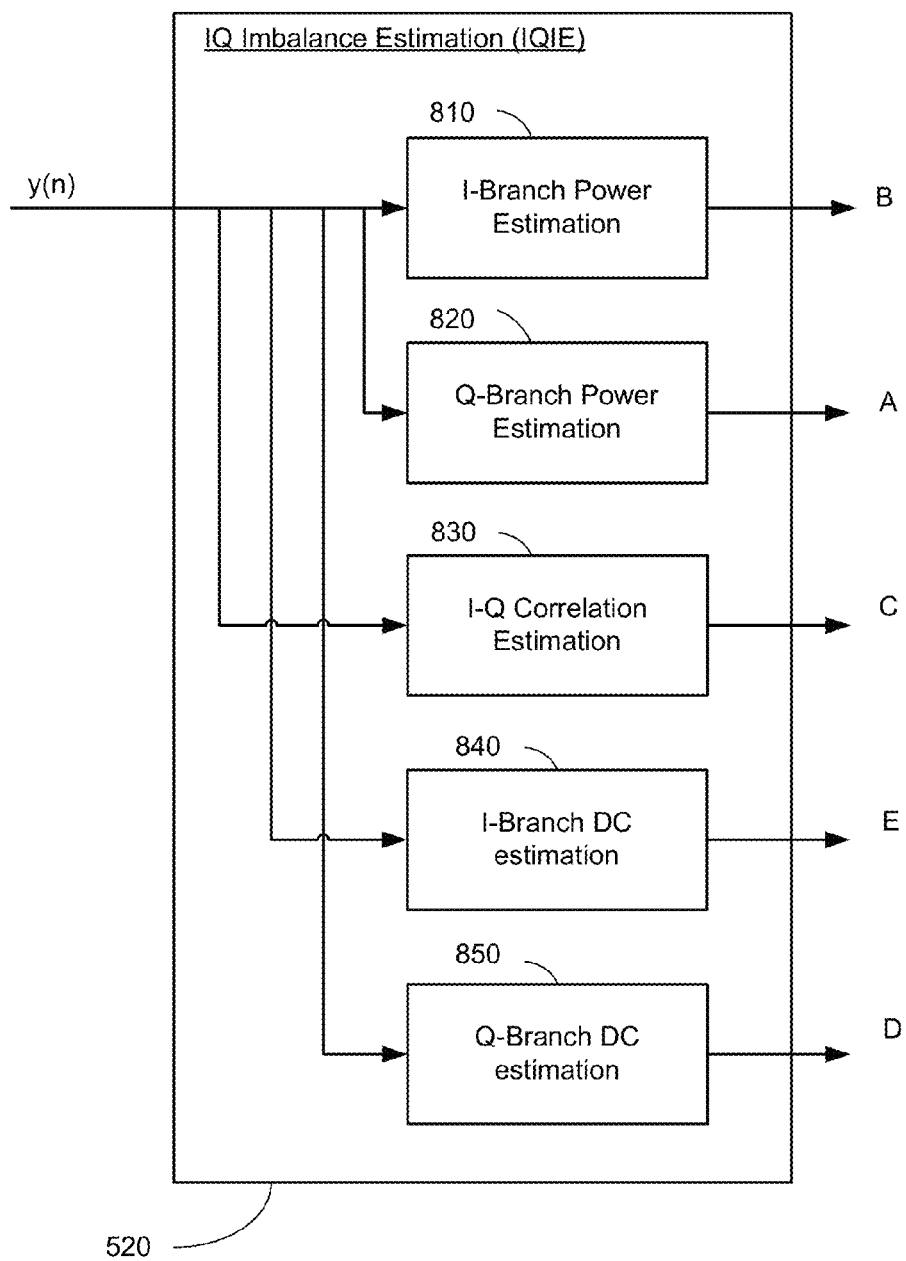
FIG. 9 shows simplified block diagram of the IQIE block without explicit removal of the DC offset.

In order to cope with the presence of a DC offset in the received signal, the IQ imbalance estimation module (520) then needs to be modified according to FIG. 9. The quantities A, B and C are computed as previously described. The IQIE module (520) also needs to generate estimates of the DC offset on the I and Q branches. The I-branch DC offset is estimated in (840) according to:

$$E = \frac{1}{N}\sum_{n=0}^{N-1} Re\{y(n)\} \quad \text{Equation 26}$$

Similarly, the Q-branch DC offset is estimated in (850) according to:

$$D = \frac{1}{N}\sum_{n=0}^{N-1} Im\{y(n)\} \quad \text{Equation 27}$$

The I/Q gain and phase imbalance are then related to the quantities A, B, C, D and E through the following equations:

$$g^2 \times \gamma = E(|Im\{(K_1 - K_2^*)u(t)e^{j\omega IFt}\}|^2) \quad \text{Equation 28}$$
$$= E(|Im\{y(t)\} - E\{Im\{y(t)\}\}|^2)$$
$$= E(|Im\{y(t)\}|^2) - (E\{Im\{y(t)\}\})^2$$
$$= A - D^2$$

$$\gamma = E(|Re\{(K_1 + K_2^*)u(t)e^{j\omega IFt}\}|^2) \quad \text{Equation 29}$$
$$= E(|Re\{y(t)\} - E\{Re\{y(t)\}\}|^2)$$
$$= E(|Re\{y(t)\}|^2) - (E\{Re\{y(t)\}\})^2$$
$$= B - E^2$$

$$g \times \gamma \times \sin(\theta) = E(Re\{(K_1 + K_2^*)u(t)e^{j\omega IFt}\} \times \quad \text{Equation 30}$$
$$Im\{(K_1 - K_2^*)u(t)e^{j\omega IFt}\})$$
$$= E(\{Re\{y(t)\} - E\{Re\{y(t)\}\}\} \times$$
$$\{Im\{y(t)\} - E\{Im\{y(t)\}\}\})$$
$$= C - ED$$

It is therefore possible for the DSP (144) to estimate the I/Q gain and phase imbalance from the values of the quantities A, B, C, D and E through the following computations:

$$g = \sqrt{\frac{A - D^2}{B - E^2}} \quad \text{Equation 31}$$

$$\sin(\theta) = \frac{C - ED}{\sqrt{(A - D^2)(B - E^2)}} \quad \text{Equation 32}$$

It is understood that the techniques presented in earlier sections of the document and showing how the DSP (144) can process the quantities provided by the IQ imbalance estimation module (520) can easily be extended to cases where the quantities D and E are provided.

A number of assumptions are made in Equation 15 in order to derive the I/Q imbalance estimates. These assumptions and the impact on the convergence of the estimator will now be analysed. Understanding the convergence behaviour of the I/Q imbalance estimation makes it possible to then derive techniques which improve the estimation accuracy.

We can denote the model of the received signal in the absence of I/Q imbalance as v(t). This can be expressed as:

$$v(t)=u(t)e^{j\omega IFt}=v_I(t)+jv_Q(t) \quad \text{Equation 33}$$

The relationships defined in Equation 18 between the quantities A, B and C and the I/Q gain and phase imbalance are only approximations. The exact version of these equations can be expressed as:

$$A=g^2\gamma_1 \sin^2\theta+g^2\gamma_Q \cos^2\theta 2g^2\beta \sin\theta \cos\theta$$

$$B=\gamma_1$$

$$C=g\gamma_1 \sin\theta+g\beta \cos\theta \quad \text{Equation 34}$$

The different quantities $\gamma_1$, $\gamma_Q$ and $\beta$ are defined as:

$$\gamma_1=E(|Re(u(t)e^{j\omega IFt})|^2)$$

$$\gamma_Q E(|Im(u(t)e^{j\omega IFt})|^2)$$

$$\beta=E\{Re\{u(t)e^{j\omega IFt}\}\times Im\{u(t)e^{j\omega IFt}\}\} \quad \text{Equation 35}$$

Previously the following assumptions were made in order to derive the I/Q imbalance:

$$\gamma_1=\gamma_Q$$

$$\beta=0 \quad \text{Equation 36}$$

The receiver samples the signal y(t) after I/Q imbalance and hence discrete-time versions of the different signals will now be used. The I/Q imbalance estimation and processing is performed over blocks of samples and the I/Q imbalance is calculated using N samples of the received signal. The convergence of the I/Q imbalance estimation depends on how quickly the following two quantities tend to 0:

$$\hat{\gamma}_I - \hat{\gamma}_Q = \frac{1}{N}\sum_{k=0}^{N-1} v_I^2(k) - \frac{1}{N}\sum_{k=0}^{N-1} v_Q^2(k) \quad \text{Equation 37}$$

$$\hat{\beta} = \frac{1}{N}\sum_{k=0}^{N-1} v_I(k) \times v_Q(k) \quad \text{Equation 38}$$

The discrete time signal v(k) can be expressed through its frequency domain representation as:

$$v(n) = \sum_{k=0}^{N-1} V_k e^{\frac{2j\pi kn}{N}}$$

Equation 39

This representation can be used to calculate the following quantities for the derivation of $\hat{\gamma}_I$ and $\hat{\gamma}_Q$:

$$v_I^2(n) = \frac{1}{2}\left(\left(\sum_{m=0}^{N-1}\sum_{l=0}^{N-1} V_m V_l^* e^{\frac{2j\pi n(m-l)}{N}}\right) + \mathrm{Re}\left\{\sum_{m=0}^{N-1}\sum_{l=0}^{N-1} V_m V_l e^{\frac{2j\pi n(m+l)}{N}}\right\}\right)$$

Equation 40

$$v_Q^2(n) = \frac{1}{2}\left(\left(\sum_{m=0}^{N-1}\sum_{l=0}^{N-1} V_m V_l^* e^{\frac{2j\pi n(m-l)}{N}}\right) - \mathrm{Re}\left\{\sum_{m=0}^{N-1}\sum_{l=0}^{N-1} V_m V_l e^{\frac{2j\pi n(m+l)}{N}}\right\}\right)$$

Hence, the difference between these two quantities can be calculated as:

$$v_I^2(n) - v_Q^2(n) = \mathrm{Re}\{v^2(n)\} = \mathrm{Re}\left\{\sum_{m=0}^{N-1}\sum_{l=0}^{N-1} V_m V_l e^{\frac{2j\pi n(m+l)}{N}}\right\} = \mathrm{Re}\left\{\sum_{m=0}^{N-1} V_m V_{N-m}\right\} + \mathrm{Re}\left\{\sum_{\substack{m=0 \\ l+m\neq N}}^{N-1}\sum_{l=0}^{N-1} V_m V_l e^{\frac{2j\pi n(m+l)}{N}}\right\}$$

Equation 41

Using the above equation, it is possible to characterize the convergence of the quantity $\hat{\gamma}_I - \hat{\gamma}_Q$:

$$\hat{\gamma}_I - \hat{\gamma}_Q = \frac{1}{N}\sum_{n=0}^{N-1}(v_I^2(n) - v_Q^2(n))$$

Equation 42

$$= \frac{1}{N}\sum_{n=0}^{N-1} \mathrm{Re}\{v^2(n)\}$$

$$= \frac{1}{N}\sum_{n=0}^{N-1}\left(\mathrm{Re}\left\{\sum_{m=0}^{N-1} V_m V_{N-m}\right\} + \mathrm{Re}\left\{\sum_{\substack{m=0 \\ l+m\neq N}}^{N-1}\sum_{l=0}^{N-1} V_m V_l e^{\frac{2j\pi n(m+l)}{N}}\right\}\right)$$

$$= \mathrm{Re}\left\{\sum_{m=0}^{N-1} V_m V_{N-m}\right\} + \mathrm{Re}\left\{\sum_{\substack{m=0 \\ l+m\neq N}}^{N-1}\sum_{l=0}^{N-1} V_m V_l \frac{1}{N}\sum_{n=0}^{N-1} e^{\frac{2j\pi n(m+l)}{N}}\right\}$$

$$= \mathrm{Re}\left\{\sum_{m=0}^{N-1} V_m V_{N-m}\right\}$$

Similarly, it can be shown that:

$$\hat{\beta} = \frac{1}{2N}\sum_{n=0}^{N-1}\mathrm{Im}\{v^2(n)\} = \frac{1}{2}\mathrm{Im}\left\{\sum_{m=0}^{N-1} V_m V_{N-m}\right\}$$

Equation 43

The above two equations show that in the general case, the quantities $\hat{\gamma}_I - \hat{\gamma}_Q$ and $\hat{\beta}$ are not guaranteed to converge to 0, even as $N \to \infty$. Hence, it is possible to get poor I/Q imbalance estimates even when the estimation is performed on large blocks of data and even if there is no noise in the received signal.

In order to characterize the convergence of the I/Q imbalance estimation method, we can define the following value which provides an indication of the error made with respect to the assumptions made in the I/Q imbalance estimation method:

$$\varepsilon = \sqrt{\frac{(\hat{\gamma}_I - \hat{\gamma}_Q)^2 + (2\hat{\beta})^2}{(\hat{\gamma}_I + \hat{\gamma}_Q)^2}}$$

Equation 44

From the previous set of equations, it is obvious to show that:

$$(\hat{\gamma}_I - \hat{\gamma}_Q)^2 + (2\hat{\beta})^2 = \left(\frac{1}{N}\sum_{n=0}^{N-1}\mathrm{Re}\{v^2(n)\}\right)^2 + \left(\frac{1}{N}\sum_{n=0}^{N-1}\mathrm{Im}\{v^2(n)\}\right)^2 = \left|\sum_{m=0}^{N-1} V_m V_{N-m}\right|^2$$

Equation 45

We can then define the following two vectors:

$$V = \{V_0, V_1, \ldots, V_{N-1}\}$$

$$\tilde{V} = \{V_{N-1}, V_{N-2}, \ldots, V_0\}$$

Equation 46

From the Cauchy-Schwarz inequality, we know that:

$$\sqrt{(\hat{\gamma}_I - \hat{\gamma}_Q)^2 + (2\hat{\beta})^2} \le |V|^2$$

Equation 47

Hence, an upper-bound can be derived for the error metric $\varepsilon$:

$$\varepsilon = \sqrt{\frac{(\hat{\gamma}_I - \hat{\gamma}_Q)^2 + (2\hat{\beta})^2}{(\hat{\gamma}_I + \hat{\gamma}_Q)^2}} = \frac{\left|\sum_{m=0}^{N-1} V_m V_{N-m}\right|}{|V|^2} \le 1$$

Equation 48

Moreover, the above equation becomes equality if and only if:

$$V = \alpha \times \tilde{V}$$

Equation 49

From the definition of V and $\tilde{V}$, it is obvious that $\alpha$ can only take the values $+1$ and $-1$.

Hence, we can conclude that $\varepsilon \le 1$ and that the error will be largest when:

$$V_k = V_{N-k} \text{ or } V_k = -V_{N-k} \quad \text{Equation 50}$$

$$\text{for } k \in \left\{0, 1, \ldots, \frac{N}{2} - 1\right\}$$

This is equivalent to saying that the estimation error is largest when the signal prior to the I/Q imbalance is either purely real or purely imaginary. This is not surprising given that this estimation method is based on the power ratio between the real and imaginary branches being equal in the absence of I/Q imbalance.

The above analysis has shown that the accuracy of the I/Q imbalance estimation can be characterized from the spectral characteristics of the transmitted signal (signal before I/Q imbalance). This information can be used in a number of ways to improve the accuracy of the I/Q estimation and correction process. First, it is possible to use this information in order to design test signals which will lead to an accurate estimation. For the cases where it is not possible for the receiver to control the spectral characteristics of the transmitted signal, it is possible for the receiver to use a-priori information on the characteristics of the transmitted signal to improve the I/Q imbalance estimation accuracy. It is also possible for the receiver to process the received signal, prior to I/Q imbalance estimation, so as to modify its spectral characteristics in a way that leads to an improved estimation accuracy. This can be achieved, for example, by applying filters to the received signal that are designed to minimize, or reduce, the I/Q imbalance estimation error metric. Alternatively, the signal conditioning stage can consist in applying a window function to the received I/Q samples. Different possible embodiments of these different approaches will now be described in more details.

From the performance analysis, it can be seen that the estimation error is minimized when $\hat{\gamma}_1 = \hat{\gamma}_Q$ and $\hat{\beta} = 0$. It is therefore possible to improve the I/Q imbalance estimation accuracy by selecting a transmitted signal which satisfies these two conditions. Such an approach would typically apply to cases where off-line calibration is possible.

From Equation 48, it is possible to express these time-domain conditions as an equivalent constraint on the spectral characteristics of the signal without I/Q imbalance:

$$|\Sigma_{m=0}^{N-1} V_m V_{N-m}| = 0 \quad \text{Equation 51}$$

One solution to the selection of a transmitted signal which satisfies the constraint above is to use a pure tone signal and make sure that the estimation period corresponds to an integer number of periods of this test signal. It should however be noted that the use of a pure tone is not the only solution which satisfies the exact estimation conditions. For example, it would be possible to achieve these conditions from any signal to which a set of orthogonal sequences are applied to the I and Q branches. The estimation period then needs to correspond to a number of samples over which the sequences are orthogonal. For example, modulating a signal with a set of Hadamard sequences would achieve the desired goal for improving the accuracy of the I/Q imbalance. Another example of signal which could be used for the training of the I/Q imbalance calibration is the set of Haar wavelets. Hence, it is possible to greatly improve the convergence properties of the I/Q imbalance characterization procedure through careful selection of the signal transmitted during the estimation process.

According to one embodiment of the invention, the signal used for I/Q imbalance estimation is generated internally by the wireless receiver using the test signal generator module (540) in the transceiver (130). It is desirable for the generated test signal to be one designed according to the principles described above. For example, the test signal general module can be configured to generate a Carrier Wave (CW) signal with a frequency selected such that the number of I/Q samples used for imbalance estimation correspond to an integer number of periods of the CW signal. However, in practical realizations this CW test signal will typically experience various forms of a-priori unknown frequency/phase error which will degrade the IQIE performance. The sources of frequency error can be fixed or time varying.

It is possible to understand the effect of such frequency offset affecting the test signal by looking at its impact on the quantity $|\Sigma_{m=0}^{N-1} V_m V_{N-m}|$. In the absence of frequency error and noise, this quantity will be equal to 0 and it is expected that accurate I/Q imbalance estimation can be performed. However, any frequency error in the test signal will lead to spectral leakage and will this result in a rise in the value of $|\Sigma_{m=0}^{N-1} V_m V_{N-m}|$. As shown in Equation 44, such a rise will result in an increase in the I/Q imbalance estimation error.

It is, however, possible to reduce this reduction in the I/Q imbalance estimation accuracy by applying windowing techniques. Such an approach can be implemented by multiplying the I/Q samples y(n) with samples from a time-domain window w(n). The windowing data is arbitrary and can take the form of several known windowing techniques such as Hamming and Hanning.

Figure 10:
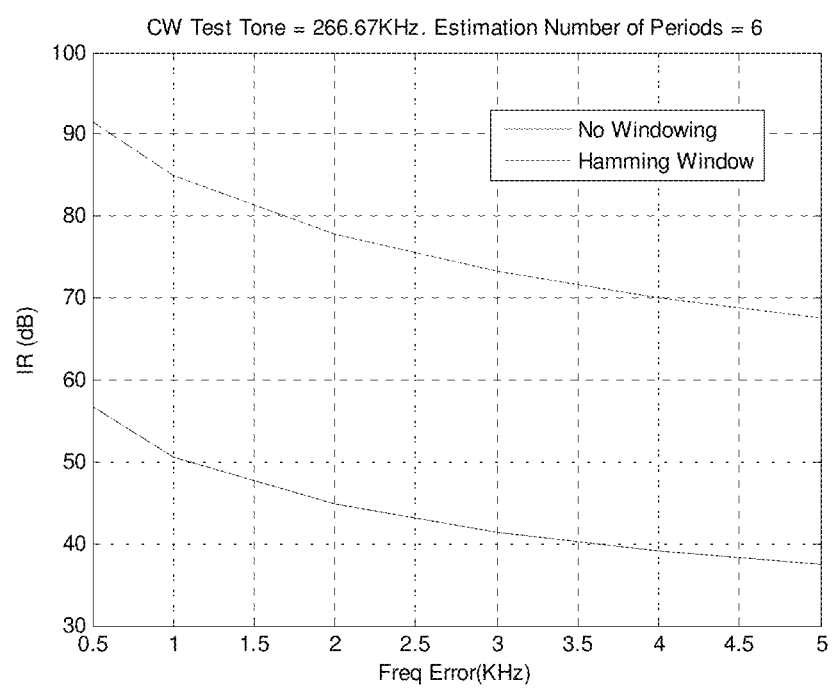
FIG. 10 shows the improvement in image rejection performance due to windowing in the presence of a fixed frequency error.

FIG. 10 illustrates the improvement in IR achieved after I/Q imbalance correction when windowing is applied. The I/Q imbalance estimation is performed using a test signal corresponding to a CW with a nominal frequency which is a multiple integer of the rate at which blocks of I/Q samples are processed. The figure then compares the IR which is achieved in the presence of an error in the CW frequency with and without windowing. It can be seen that the presence of a frequency error degrades the I/Q imbalance estimation and correction performance which results in a reduction on the IR. However, it can also be observed that the IR which is achieved with windowing is significantly higher than that achieved without. For a frequency error of 2 kHz, it is possible to achieve an IR of just under 80 dB when windowing is used. In the absence of windowing, the IR is around 45 dB. Hence, an improvement in the IR greater than 35 dB has been obtained by using the windowing approach.

Windowing can be implemented by applying the window function to the received I/Q samples. However, such an approach requires the DC offset present in the received signal to be removed prior to windowing and I/Q imbalance estimation as the application of the window function modifies the DC content of the received signal. As indicated previously, this may be undesirable as this may lead to buffering requirements. In an alternative embodiment of the windowing approach, the received I/Q samples are not modified but the effect of the window function is taken into account when the I/Q imbalance estimation module (520) computes the different quantities provided to the DSP (144).

Figure 11:
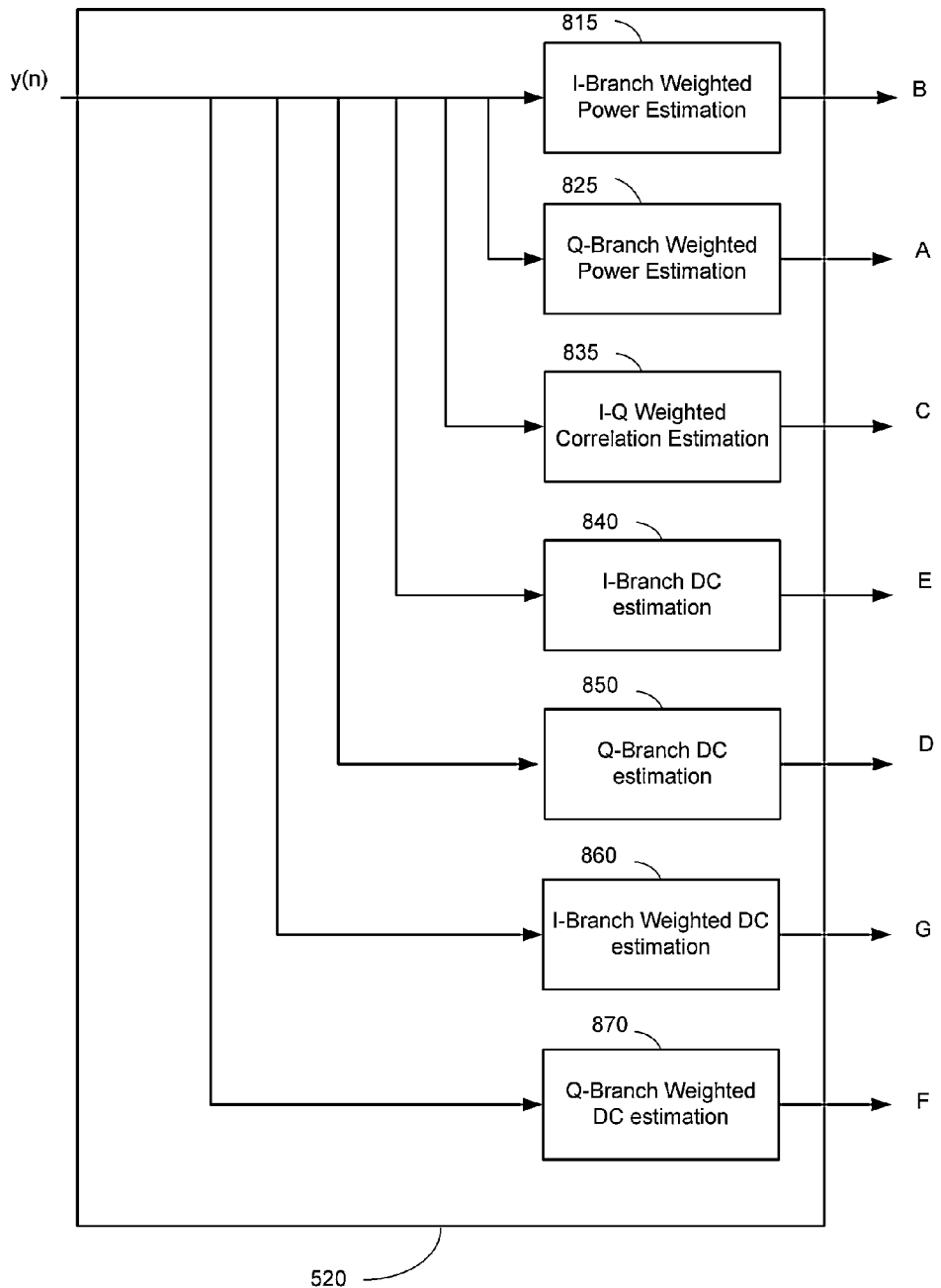
FIG. 11 shows a simplified block diagram of the IQIE block with windowing.

FIG. 11 shows the version of the IQIE module (520) with windowing where buffering of the received signal prior to I/Q imbalance correction is not required. The blocks (815), (825) and (835) are modified versions of the blocks (810), (820) and (830) where the windowing is modelled in the computation of the quantities A, B and C. These blocks calculate the following three quantities:

$$A = \frac{1}{N}\sum_{n=0}^{N-1} w^2(n) \times (\text{Re}\{y(n)\})^2 \quad \text{Equation 52}$$

$$B = \frac{1}{N}\sum_{n=0}^{N-1} w^2(n) \times (\text{Im}\{y(n)\})^2 \quad \text{Equation 53}$$

$$C = \frac{1}{N}\sum_{n=0}^{N-1} w^2(n) \times \text{Re}\{y(n)\} \times \text{Im}\{y(n)\} \quad \text{Equation 54}$$

$w(n)$, $n \in \{0, 1, \ldots N-1\}$ denotes the samples of the window function.

Two further quantities, F and G are calculated by blocks (870) and (860), respectively, according to:

$$F = \frac{1}{N}\sum_{n=0}^{N-1} w^2(n) \times (\text{Re}\{y(n)\}) \quad \text{Equation 55}$$

$$G = \frac{1}{N}\sum_{n=0}^{N-1} w^2(n) \times (\text{Im}\{y(n)\}) \quad \text{Equation 56}$$

The quantities D and E are calculated as previously.

The I/Q gain and phase imbalance can then be expressed as functions of these quantities through the following set of equations:

$$g^2 \times \gamma = A + D^2 W^2 - 2DF \quad \text{Equation 57}$$

$$\gamma = B + E^2 W^2 - 2EG \quad \text{Equation 58}$$

$$g \times \gamma \times \sin(\theta) = C + DEW^2 - EF - DG \quad \text{Equation 59}$$

Where $W^2$ denotes the power of the windowing function and is therefore known a-priori by the receiver:

$$W^2 = \frac{1}{N}\sum_{k=0}^{N-1} w^2(n) \quad \text{Equation 60}$$

The DSP (144) can therefore estimate the I/Q gain and phase imbalance from the quantities A, B, C, D, E, F and G calculated by the IQIE module (520) as follows:

$$g = \sqrt{\frac{A + D^2 W^2 - 2DF}{B + E^2 W^2 - 2EG}} \quad \text{Equation 61}$$

$$\sin(\theta) = \frac{C + DEW^2 - EF - DG}{\sqrt{(A + D^2 W^2 - 2DF)(B + E^2 W^2 - 2EG)}} \quad \text{Equation 62}$$

The description of the windowing approach for I/Q imbalance estimation was given for the receiver configuration where the DC offset removal block (550) is omitted. When DC offset removal is performed prior to I/Q imbalance estimation, it is possible to derive the estimates of the gain and phase imbalance directly from the quantities A, B and C provided by blocks (815), (825) and (835):

$$g = \sqrt{\frac{A}{B}} \quad \text{Equation 63}$$

$$\sin(\theta) = \frac{C}{\sqrt{A \times B}} \quad \text{Equation 64}$$

It will be obvious to the person skilled in the art that the different techniques presented herein to improve the I/Q imbalance estimation performance can also be applied when the windowing approach is implemented.

It has been shown that it is possible to improve the I/Q imbalance estimation and correction accuracy by controlling the properties of the transmitted signal so as to minimize the error criteria defined in Equation 48. However, even when this cannot be achieved, it is possible to improve the accuracy of the I/Q imbalance estimation when knowledge of the statistics of the transmitted signal is available. Previous calculations rely on the assumptions $\hat{\gamma}_I = \hat{\gamma}_Q$ and $\hat{\beta} = 0$ for the estimation procedure. It should however be noted that Equation 34 can be solved without making such assumptions as long as $\hat{\gamma}_I$, $\hat{\gamma}_Q$ and $\hat{\beta}$ are known:

$$\hat{\gamma}_I G_Q^2 + \hat{\gamma}_Q G_I^2 + 2\hat{\beta} G_I G_Q - A = 0$$

$$\hat{\gamma}_I G_Q + \hat{\beta} G_I = C \quad \text{Equation 65}$$

where $G_I$ and $G_Q$ are defined as:

$$G_I = g \cos \theta$$

$$G_Q = g \sin \theta \quad \text{Equation 66}$$

When the DSP (144) has information on the statistical properties of the transmitted signal in the form of values for the quantities $\hat{\gamma}_I$, $\hat{\gamma}_Q$ and $\hat{\gamma}$, it is possible to combine this information with that provided by the I/Q imbalance estimation module (520) when estimating the I/Q gain and phase imbalance. In the absence of DC offset, it is possible to estimate the quantities $G_I$ and $G_Q$ as follows:

$$G_I = \sqrt{\frac{A\hat{\gamma}_I - C^2}{\hat{\gamma}_I \hat{\gamma}_Q - \hat{\beta}^2}} \quad \text{Equation 67}$$

$$G_Q = \frac{1}{\hat{\gamma}_I}(C - G_I \hat{\beta}) \quad \text{Equation 68}$$

Once $G_I$ and $G_Q$ have been derived, it is easy to generate the I/Q imbalance through:

$$g = \sqrt{G_I^2 + G_Q^2}$$

$$\theta = \arctan(G_Q/G_I) \approx G_Q/G_I \quad \text{Equation 69}$$

The set of equations above show that it is possible to improve the accuracy of the I/Q imbalance estimation by making use of a-priori knowledge on the statistical properties of the transmitted signal. The receiver may have a-priori knowledge of the statistical properties of the transmitted signal. Alternatively, it is possible for the transmitter to signal this information to the receiver.

It was shown that the use of windowing techniques on the received signal can lead to an improved I/Q imbalance estimation performance. Such an improvement is not limited to the use of windowing and can be achieved through a number of different signal conditioning techniques. For example, it would be possible to apply a low-pass filter to the received signal as an alternative signal conditioning approach.

Figure 12:
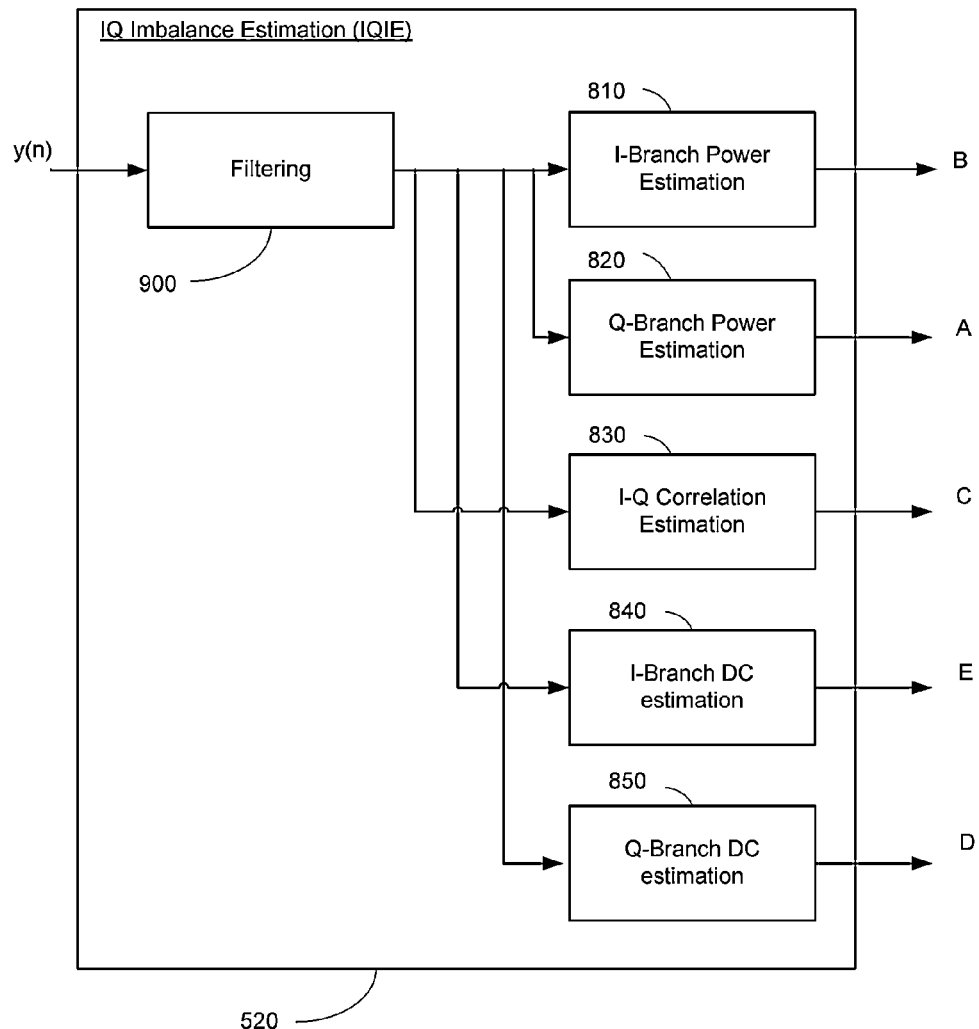
FIG. 12 shows a simplified block diagram of the IQIE block with filtering.

FIG. 12 presents the IQIE module (520) when filtering is applied to the received signal prior to the generation of the different quantities used by the DSP (144) to estimate the I/Q gain and phase imbalance values. The different quantities A, B, C, D and E are calculated by the blocks (810), (820), (830), (840) and (850) as previously described. Prior to being applied to these different blocks, the received signal y(n) is processed by the digital filter (900).

Figure 13:
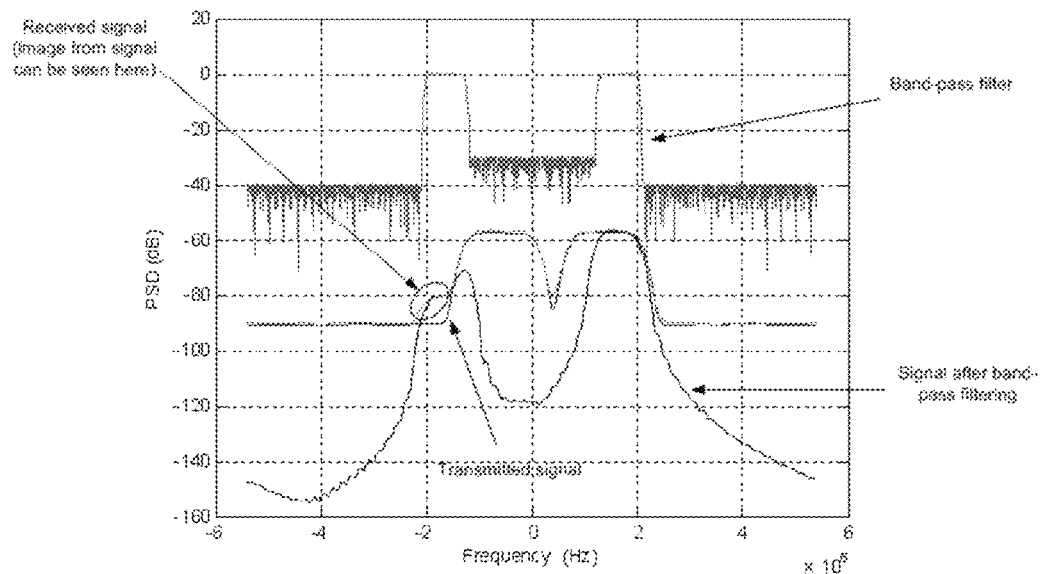
FIG. 13 shows the impact of a band pass filter on the IQIE signal spectrum.
Figure 14:
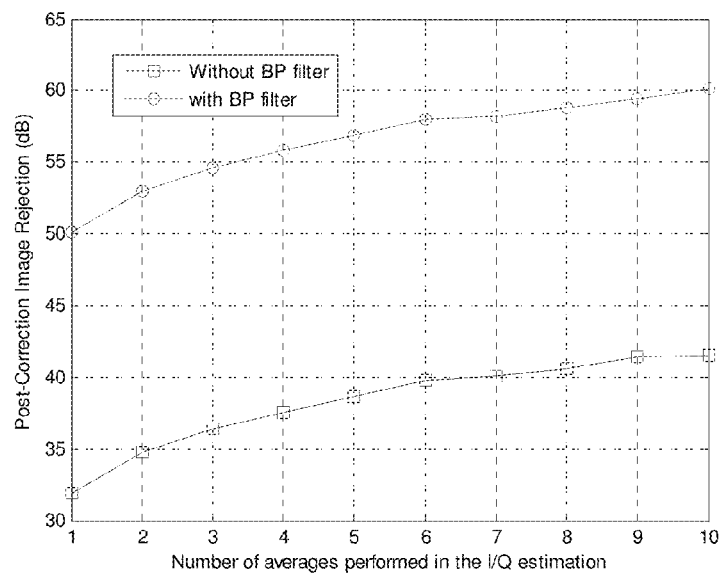
FIG. 14 shows the post correction image rejection through the use of signal conditioning prior to IQIE.

FIG. 13 and FIG. 14 illustrate the I/Q imbalance estimation gains that can be achieved by filtering the received signal prior to imbalance estimation. FIG. 13 shows an example received signal with a band-pass filter implementation of the digital filter (900). FIG. 14 presents the IRR which is achieved with and without filtering. It can be seen that for the configuration being tested, the use of filtering increases the IRR from 32 dB up to 50 dB when a single block of I/Q samples is processed. Hence, a gain of 18 dB in the IRR has been achieved in this example by applying the filter (900) to the received signal. It can also be seen that this gain is essentially independent of the number of averages used for the I/Q imbalance estimation.

A number of different approaches can be used for the design of the digital filter (900). It can however be noted that any transformation with a symmetric frequency response will be suitable. When the transformation satisfies the symmetric frequency response condition, it can be shown that the application of the digital filter to the received signal can be modelled in an equivalent manner as a filtering operation on the transmitted signal. A shown previously, the accuracy of the I/Q imbalance estimation is improved when the error signal defined by Equation 48 is reduced. Hence, it will be an objective for the design of the digital filter (900) to minimise the following quantity:

$$\frac{\left|\sum_{m=0}^{N-1} H_m H_{N-m} V_m V_{N-m}\right|}{\sum_{m=0}^{N-1} |H_m|^2 |V_m|^2} \quad \text{Equation 70}$$

where $H_m, m \in \{0, \ldots, N-1\}$ characterizes the frequency response of the digital filter (900).

Since the transformation needs to have a symmetric frequency response, the further constraint needs to be met:

$$H_N = H^*_{N-m} \quad \text{Equation 71}$$

Hence, the criteria for the design of the digital filter can then be expressed as:

minimise $|\Sigma_{m=0}^{N-1} G_m V_m V_{N-m}|^2$ under the constraint that $\Sigma_{m=0}^{N-1} G_m |V_m|^2$ is constant   Equation 72 where $G_m$ denotes the power frequency response of the digital filter, i.e. $G_m = |V_m|^2$.

Different approaches can be used in order to design a filter according to the criteria defined in Equation 72. For example, it would be possible to design such a filter through simulations. Alternatively, the equation can be solved using the Lagrange multiplier method. When such an approach is used, the digital filter frequency response can be found to be equal to:

$$G = \frac{c}{Y^T (XX^H)^{-1} Y} (XX^H)^{-1} Y \quad \text{Equation 73}$$

where c is a design constant which can be set arbitrarily and the quantities X and Y are vectors defined to contain the following values:

$$X_m = V_m V_{N-m} \quad \text{Equation 74}$$

$$Y_m = |V_m|^2 \quad \text{Equation 75}$$

Designing the digital filter according to Equation 73 requires knowledge of the frequency response of the transmitted signal. Such knowledge may be available to the receiver when a test signal is used to perform the I/Q imbalance estimation.

However, when the receiver operates on signal to be recovered by the I/Q processing module (143), this information will not typically be available to the receiver. In such cases, the approach described above can still be used by, for example, replacing the values of the frequency response of the transmitted signal with average values for example.

It would also be possible for the receiver to store multiple configurations of the digital filter (900) and to select the best configuration to use for the I/Q imbalance estimation using metrics measured on the received signal. For example, the receiver could detect the presence of strong adjacent channel signals in order to select which filter configuration to apply.

Essentially, any digital filter with real coefficients and a frequency response such that the value of the quantity $$\frac{\left|\sum_{m=0}^{N-1} G_m V_m V_{N-m}\right|^2}{\sum_{m=0}^{N-1} G_m |V_m|^2}$$

is reduced can be used to improve the accuracy of the I/Q imbalance estimation.

Those skilled in the art will appreciate that the several modules and components depicted in the figures and described herein, including but not limited, digital base-band module 140, DSP circuitry 144, IQIE 520 and IQIC 530 may be implemented in hardware, software or a combination thereof. For example, such components may together or separately be embodied in an application specific integrated circuit (ASIC) configured with logic and associated memory (including software or logic instructions as appropriate) to operated in accordance with the functionality described herein.

Although the apparatus, system, and method are illustrated and described herein as embodied in one or more specific examples, it is nevertheless not intended to be limited to the details shown, since various modifications and structural changes may be made therein without departing from the scope of the apparatus, system, and method, and within the scope and range of equivalents of the claims. Accordingly, it is appropriate that the appended claims be construed broadly and in a manner consistent with the scope of the apparatus, system, and method, as set forth in the following claims.

What is claimed is:

1. A wireless communication receiver, comprising:
   a radio frequency (RF) front end configured to be in communication with an antenna;
   a digital baseband processing module in communication with the RF front end and, comprising:
   a digital front end, comprising:
      an I/Q imbalance estimation module that receives plurality of I/Q samples of a received baseband signal and calculates a number of quantities characterizing properties of the plurality of I/Q samples of a received baseband signal; and an I/Q imbalance correction module that applies a plurality of I/Q imbalance correction values to the plurality of the I/Q samples of the received baseband signal;

a digital processing module, coupled to the digital front end, that generates a plurality of estimates characterizing gain and phase imbalance according to at least part of the quantities characterizing at least part of the properties of the I/Q samples of the received baseband signal, wherein the digital processing module uses the estimates characterizing the gain and the phase imbalance to calculate a configuration of generation of the I/Q imbalance correction values and supplies the same to the I/Q imbalance correction module, wherein the I/Q imbalance correction module generates one set of the I/O imbalance correction weights on one block of the I/Q samples according to one set of the estimates of the gain and the phase imbalance calculated from a set of quantities of another one block of the I/Q samples.

2. The wireless communication receiver of claim 1, wherein the I/Q imbalance estimation module calculates estimates on power and cross-correlation of the I/Q samples of the received baseband signal as at least part of the quantities characterizing the properties of the I/Q samples.

3. The wireless communication receiver of claim 2, wherein the digital processing module calculates the estimates on gain g using the equation:

$$g = \sqrt{\frac{A}{B}}$$

Where A and B denotes the quantities characterizing respective estimates on power of the I samples and Q samples of the baseband received signal.

4. The wireless communication receiver of claim 3, wherein the digital processing module calculates the estimates on phase imbalance θ using the equation:

$$\sin(\theta) = \left(\frac{g \times C}{A}\right) = \left(\frac{C}{B \times g}\right) = \frac{C}{\sqrt{A \times B}}$$

Where C denotes the quantities characterizing estimates on cross-correlation between the I samples and the Q samples of the baseband received signal.

5. The wireless communication receiver of claim 2, wherein the I/Q imbalance estimation module further calculates DC offsets of the I/Q samples of the received baseband signal as at least part of the quantities characterizing the properties of the I/Q samples.

6. The wireless communication receiver of claim 1, wherein the I/Q imbalance correction module is configured to perform on one block of the I/Q samples according to one set of the estimates characterizing the gain and the phase imbalance that is generated based on at least one set of the quantities of at least one block of the I/Q samples that is different from the block on which the I/Q imbalance correction module performs.

7. The wireless communication receiver of claim 1, wherein the I/Q imbalance correction module is configured to perform on one block of the I/Q samples according to multiple sets of the estimates characterizing the gain and the phase imbalance that are generated based on multiple sets of quantities of multiple blocks of the I/Q samples.

8. The wireless communication receiver of claim 7, wherein the I/Q imbalance estimation module generates a plurality of quality metrics for respective blocks of the I/Q samples to accordingly weigh contributions of the sets of the quantities of the corresponding blocks of the I/Q samples.

9. The wireless communication receiver of claim 6 or 7, wherein the I/Q imbalance estimation module is able to generate the at least one set of quantities based on the I/Q samples of the received signal that is generated by a test signal generator module.

10. The wireless communication receiver of claim 1, wherein the digital front end further comprises a DC offset removal circuit that removes DC offset from the I/Q samples before the I/Q imbalance estimation module calculates the quantities.

11. The wireless communication receiver of claim 1, wherein the I/Q imbalance estimation module further multiplies the I/Q samples with samples from a time-domain window such that a frequency error is reduced from the calculated quantities.

12. The wireless communication receiver of claim 1, wherein the I/Q imbalance estimation module further comprises a filter that applies to the received baseband signal prior to generation of the quantities so as to relieve attenuation of the I/Q samples of the received baseband signal.

13. The wireless communication receiver of claim 12, wherein the filter is configured to have a symmetric frequency response.

14. The wireless communication receiver of claim 12, wherein the filter is configured according to prior knowledge of a frequency response of a transmitted signal.

15. The wireless communication receiver of claim 12, wherein a set of filter configurations is selectable for the filter according to a channel condition.

16. The wireless communication receiver of claim 1, wherein the I/Q imbalance estimation module further performs signal conditioning on the received baseband signal based on presence or absence of other signals.

17. The wireless communication receiver of claim 1, wherein the digital signal processor is able to collect a plurality of sets of quantities from the I/Q imbalance estimation module prior to any operation applied on the I/Q imbalance correction module.

18. The wireless communication receiver of claim 1, wherein the I/Q imbalance correction module is able to generate the plurality of I/Q imbalance correction values based on prior knowledge of characteristics of a transmitted signal.

19. A wireless communication receiver, comprising:
a radio frequency (RF) front end configured to be in communication with an antenna;
a digital baseband processing module in communication with the RF front end and, comprising:
a digital front end, comprising:
an I/Q imbalance estimation module that receives plurality of I/Q samples of a received baseband signal and calculates a number of quantities characterizing properties of the plurality of I/Q samples of a received baseband signal; and
an I/Q imbalance correction module that applies a plurality of I/Q imbalance correction values to the plurality of the I/Q samples of the received baseband signal;
a digital processing module, coupled to the digital front end, that generates a plurality of estimates characterizing gain and phase imbalance according to at least part of the quantities characterizing at least part of the properties of the I/Q samples of the received baseband signal, wherein the digital processing module uses the estimates characterizing the gain and the phase imbalance to calculate a configuration of generation of the I/Q imbalance correction values and supplies the same to the I/Q imbalance correction module, wherein the I/Q imbalance correction module is configured to perform on one block of the I/Q samples according to one set of the estimates characterizing the gain and the phase imbalance that is generated based on at least one set of the quantities of at least one block of the I/Q samples that is different from the block on which the I/Q imbalance correction module performs.

20. A wireless communication receiver, comprising:
a radio frequency (RF) front end configured to be in communication with an antenna;
a digital baseband processing module in communication with the RF front end and, comprising:
a digital front end, comprising:
   an I/Q imbalance estimation module that receives plurality of I/Q samples of a received baseband signal and calculates a number of quantities characterizing properties of the plurality of I/Q samples of a received baseband signal; and
   an I/Q imbalance correction module that applies a plurality of I/Q imbalance correction values to the plurality of the I/Q samples of the received baseband signal;
a digital processing module, coupled to the digital front end, that generates a plurality of estimates characterizing gain and phase imbalance according to at least part of the quantities characterizing at least part of the properties of the I/Q samples of the received baseband signal, wherein the digital processing module uses the estimates characterizing the gain and the phase imbalance to calculate a configuration of generation of the I/Q imbalance correction values and supplies the same to the I/Q imbalance correction module, wherein the I/Q imbalance estimation module further multiplies the I/Q samples with samples from a time-domain window such that a frequency error is reduced from the calculated quantities.

* * * * *